United States Patent
Lee et al.

(10) Patent No.: US 11,929,852 B2
(45) Date of Patent: Mar. 12, 2024

(54) TRANSMISSION/RECEPTION METHOD IN 1-BIT QUANTIZATION SYSTEM, AND DEVICE THEREFOR

(71) Applicant: LG ELECTRONICS INC., Seoul (KR)

(72) Inventors: Sangrim Lee, Seoul (KR); Hojae Lee, Seoul (KR); Kijun Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 17/624,199

(22) PCT Filed: Jul. 3, 2019

(86) PCT No.: PCT/KR2019/008141
§ 371 (c)(1),
(2) Date: Dec. 30, 2021

(87) PCT Pub. No.: WO2021/002506
PCT Pub. Date: Jan. 7, 2021

(65) Prior Publication Data
US 2022/0376954 A1    Nov. 24, 2022

(51) Int. Cl.
*H04L 25/02* (2006.01)
*H04B 17/309* (2015.01)
(Continued)

(52) U.S. Cl.
CPC ....... *H04L 25/0224* (2013.01); *H04B 17/309* (2015.01); *H04L 1/0026* (2013.01);
(Continued)

(58) Field of Classification Search
CPC combination set(s) only.
See application file for complete search history.

(56) References Cited

U.S. PATENT DOCUMENTS 6,487,255 B1 * 11/2002 Arslan .............. H04L 25/03184
375/348
7,342,872 B1 * 3/2008 Jones, IV .............. H04L 25/067
375/283
(Continued)

FOREIGN PATENT DOCUMENTS

JP    2006-014295 A    1/2006

OTHER PUBLICATIONS

International Search Report from PCT/KR2019/008141, dated Mar. 31, 2020.
(Continued)

*Primary Examiner* — Freshteh N Aghdam
(74) *Attorney, Agent, or Firm* — BRYAN CAVE LEIGHTON PAISNER LLP

(57) ABSTRACT

The present disclosure provides a method for transmitting and receiving in a wireless communication system and an apparatus therefore. Specifically, in a wireless communication system according to an embodiment of the present disclosure, there is provided a method for transmitting and receiving a signal by a receiving apparatus, the method includes receiving, from a transmitting apparatus, signals modulated based on a differential phase shift keying (DPSK) method through a plurality of reception paths, calculating a differential value in each reception path of the plurality of reception paths based on the received signals, and calculating reliability for the received signals, in which the reliability is proportional to a real value of a sum of the differential values in each reception path of the plurality of reception paths.

16 Claims, 13 Drawing Sheets

(51) Int. Cl.
*H04L 1/00* (2006.01)
*H04L 1/20* (2006.01)
*H04L 25/06* (2006.01)
*H04L 25/49* (2006.01)

(52) U.S. Cl.
CPC .......... *H04L 1/206* (2013.01); *H04L 25/0272* (2013.01); *H04L 25/067* (2013.01); *H04L 25/4927* (2013.01)

(56) References Cited

U.S. PATENT DOCUMENTS

| | | | | |
|---|---|---|---|---|
| 9,203,558 B1* | 12/2015 | Dave | ............... | H04L 23/00 |
| 2004/0036647 A1* | 2/2004 | Lee | ............... | H04B 7/0857 |
| | | | | 342/135 |
| 2012/0141144 A1* | 6/2012 | Cai | ............... | H04B 10/616 |
| | | | | 398/202 |
| 2013/0279548 A1* | 10/2013 | Amanullah | ......... | H04L 27/2078 |
| | | | | 375/330 |
| 2013/0343494 A1* | 12/2013 | Bolinth | ............ | H04B 7/0871 |
| | | | | 375/347 |

OTHER PUBLICATIONS

Written Opinion of the ISA from PCT/KR2019/008141, dated Mar. 31, 2020.

* cited by examiner

[FIG. 1]
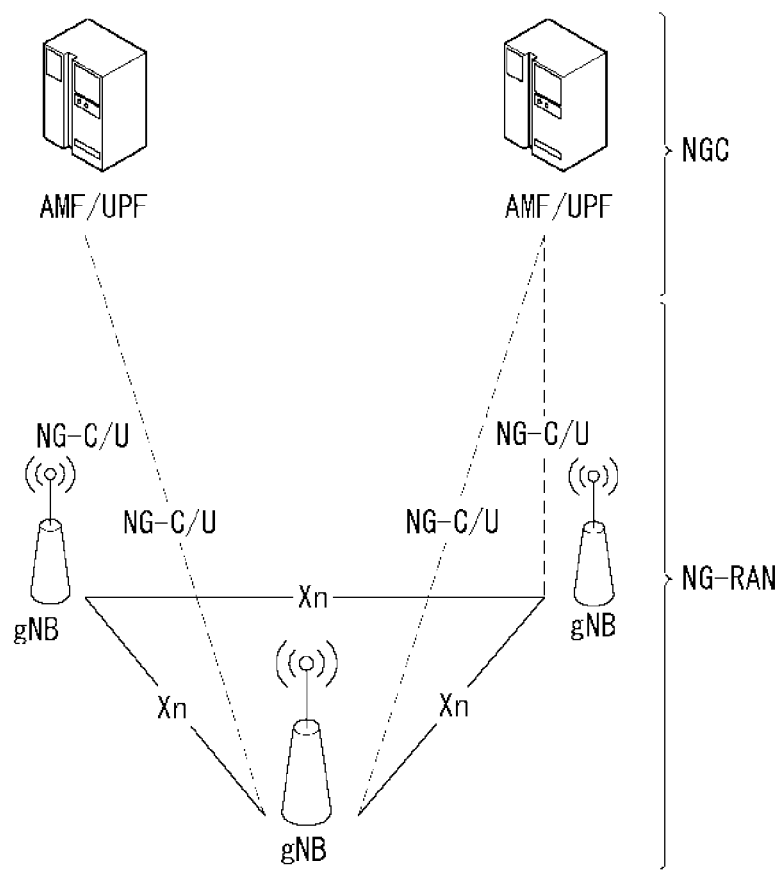
[FIG. 2]
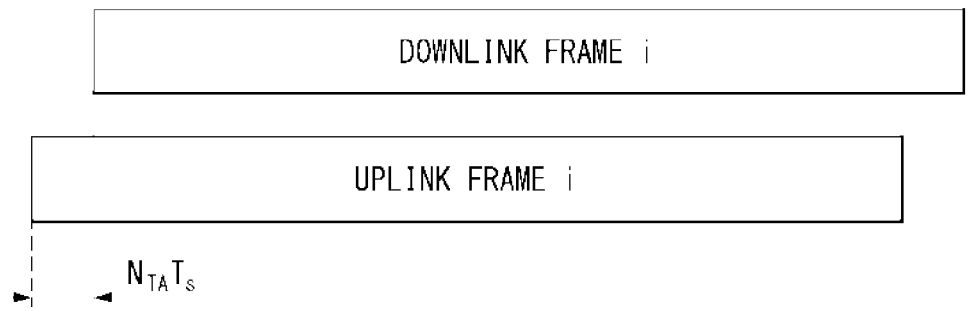

[FIG. 3]
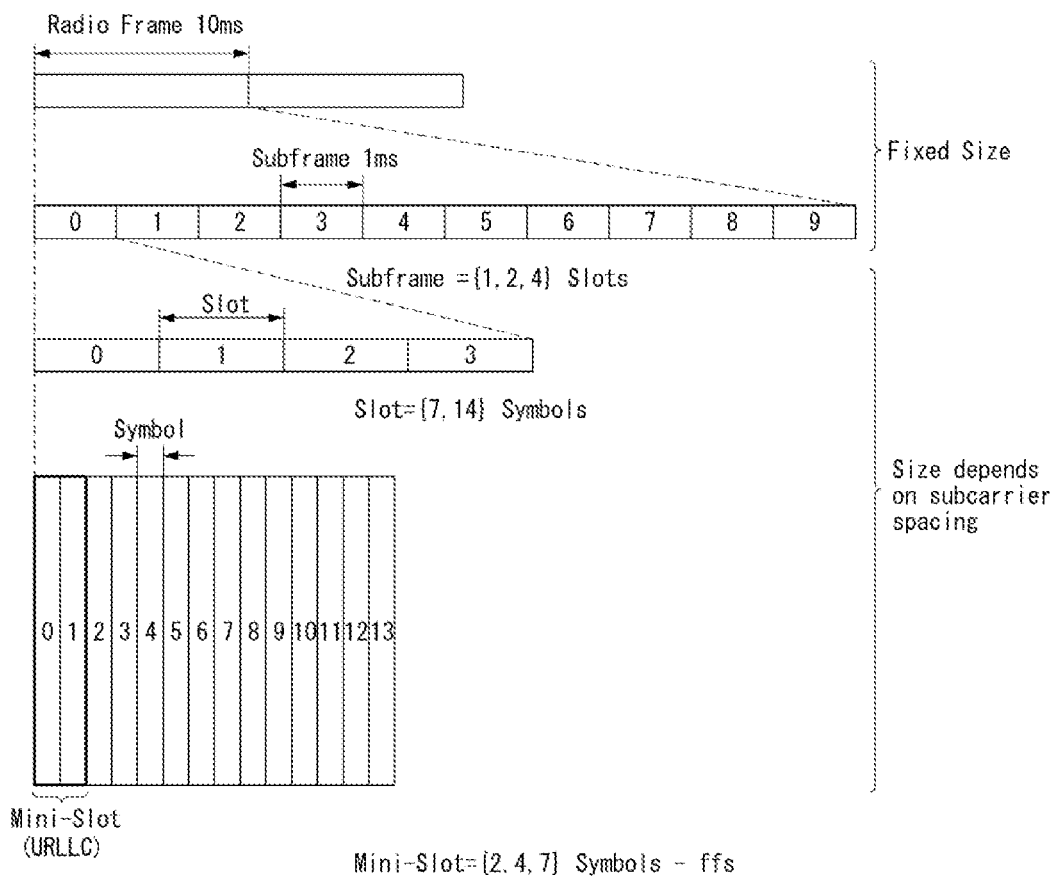

[FIG. 4]
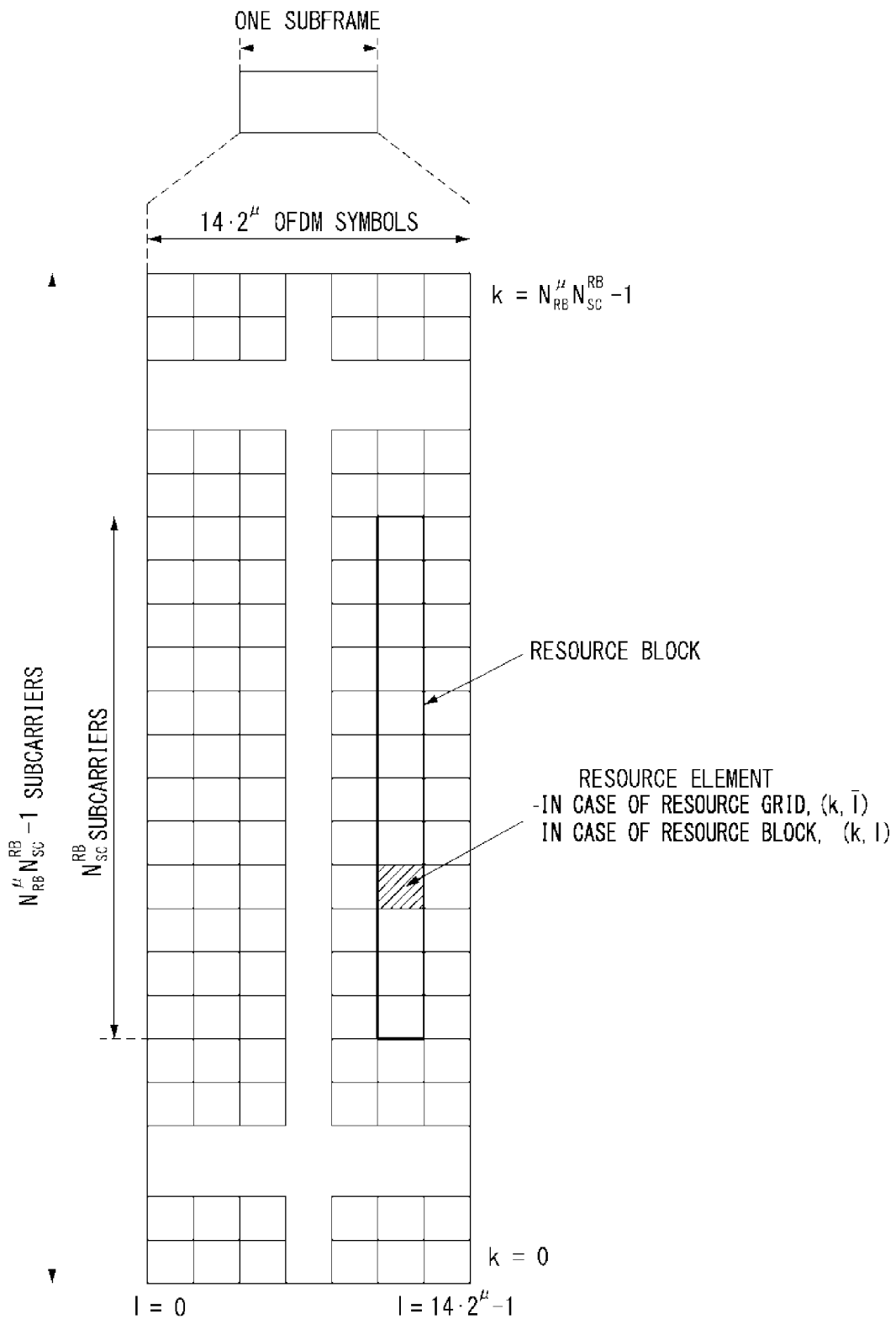

[FIG. 5]
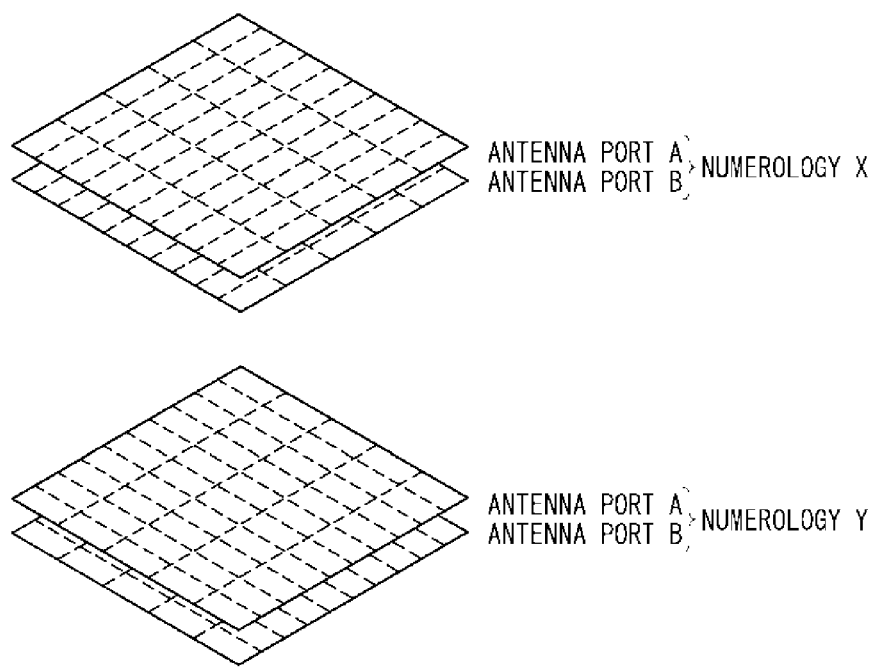
[FIG. 6]
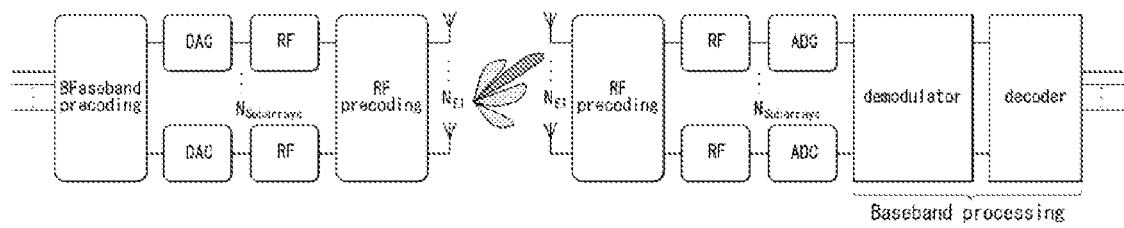

[FIG. 7]
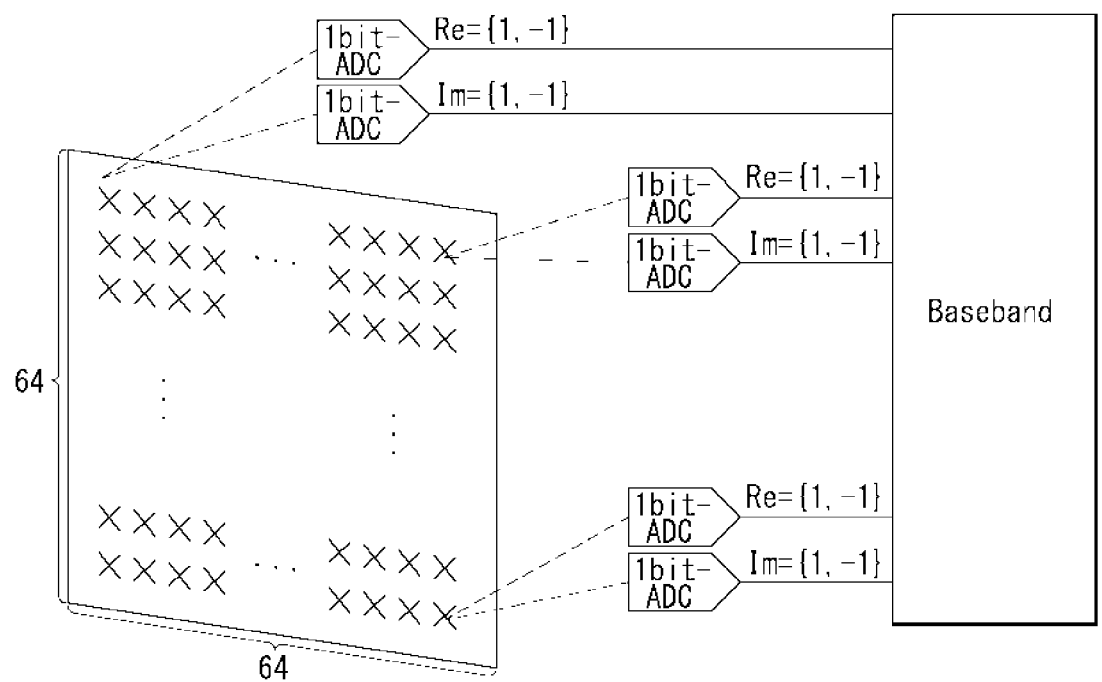

[FIG. 8]
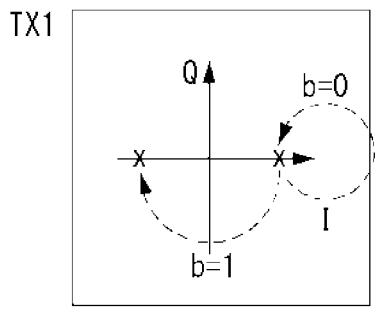
[FIG. 9]
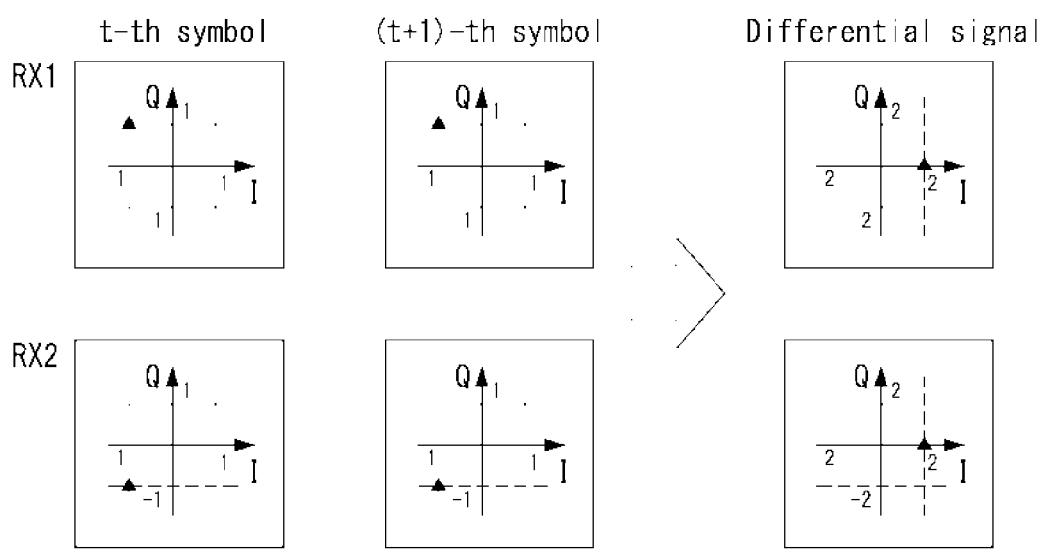
[FIG. 10]
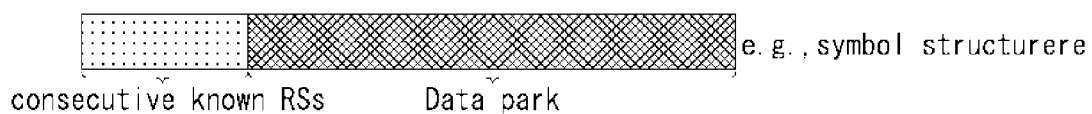

[FIG. 11]
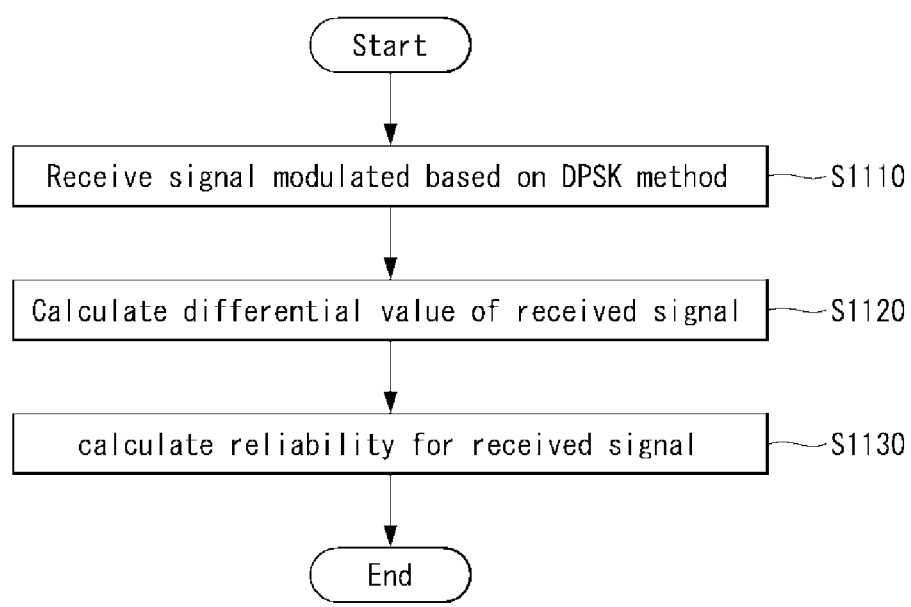

[FIG. 12]
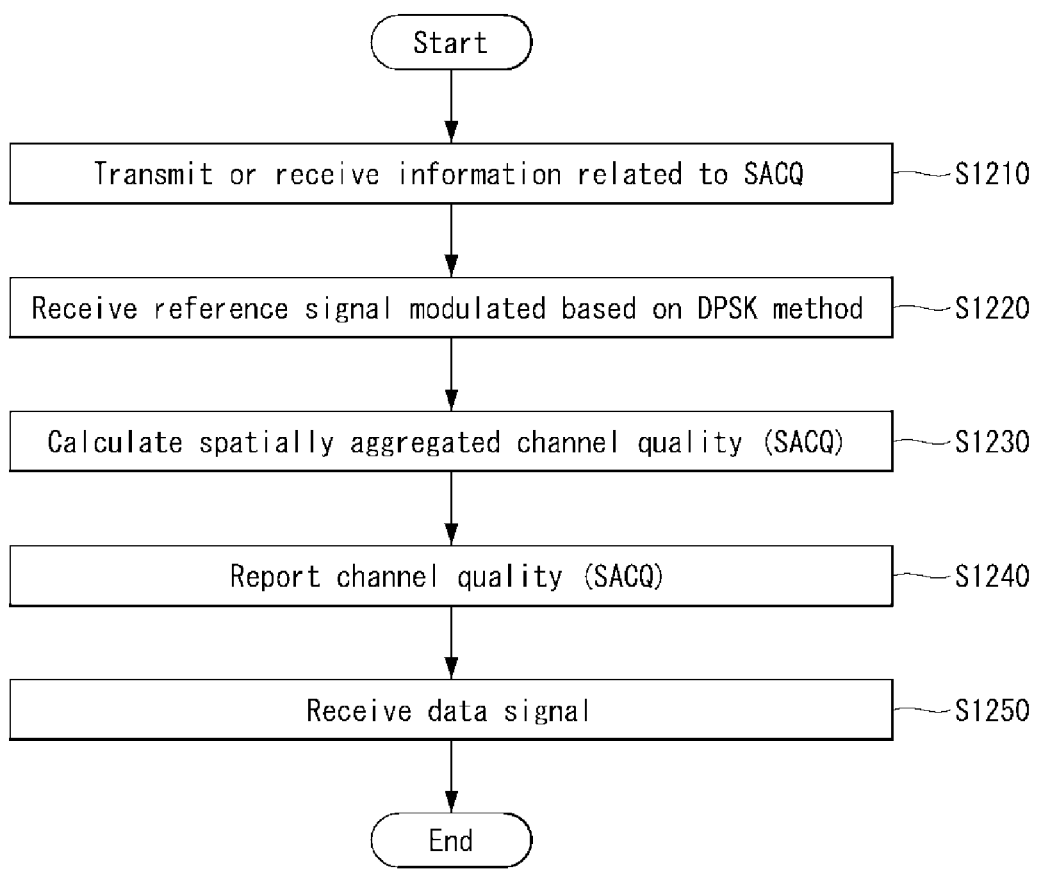

[FIG. 13]
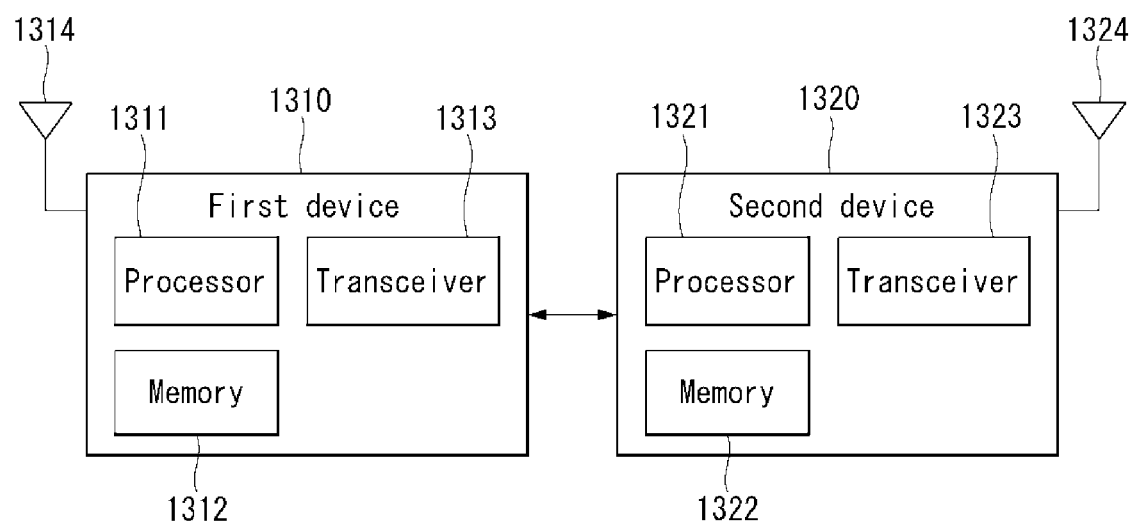

[FIG. 14]
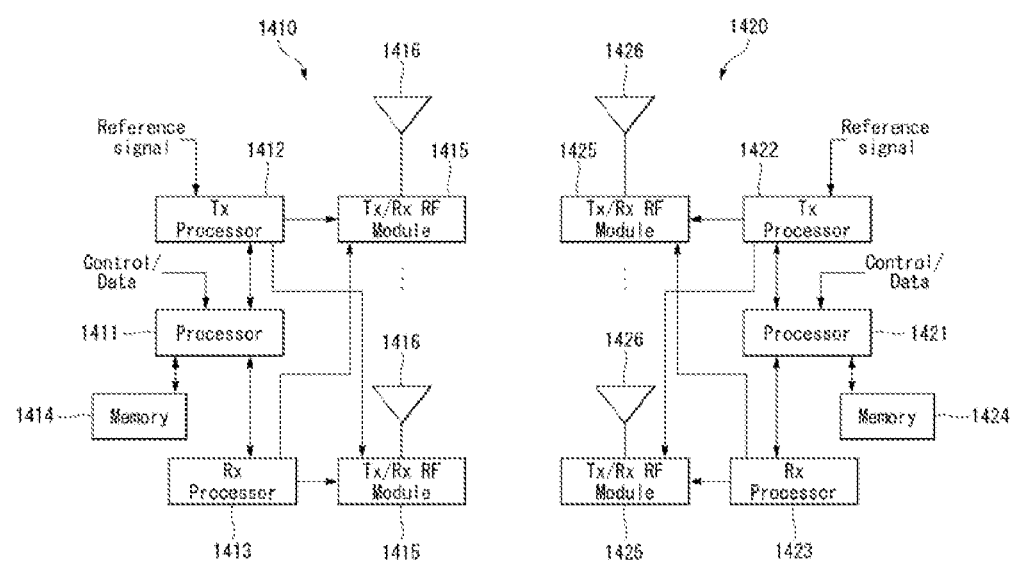

[FIG. 15]
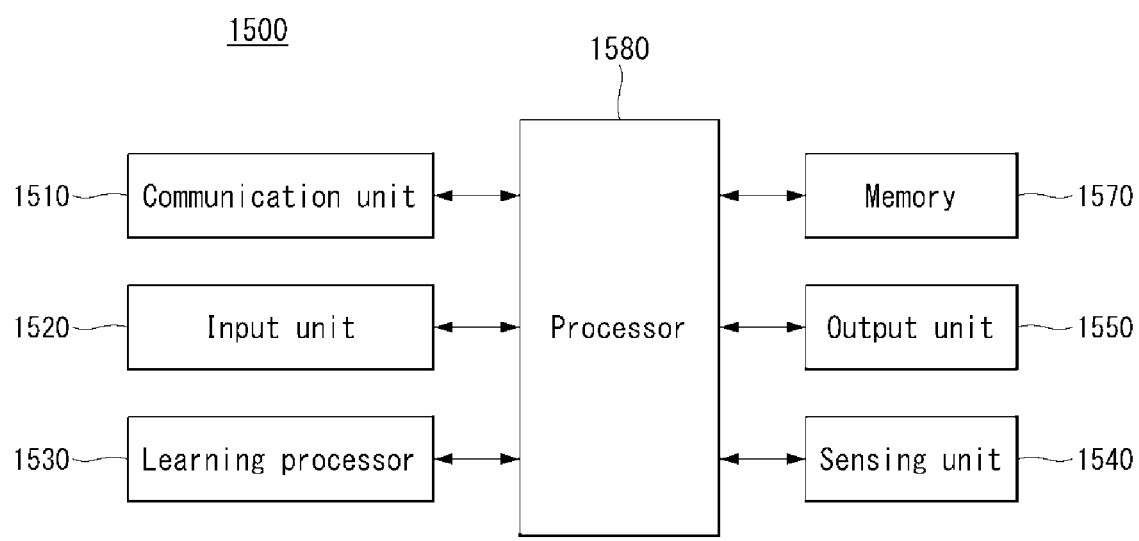

[FIG. 16]
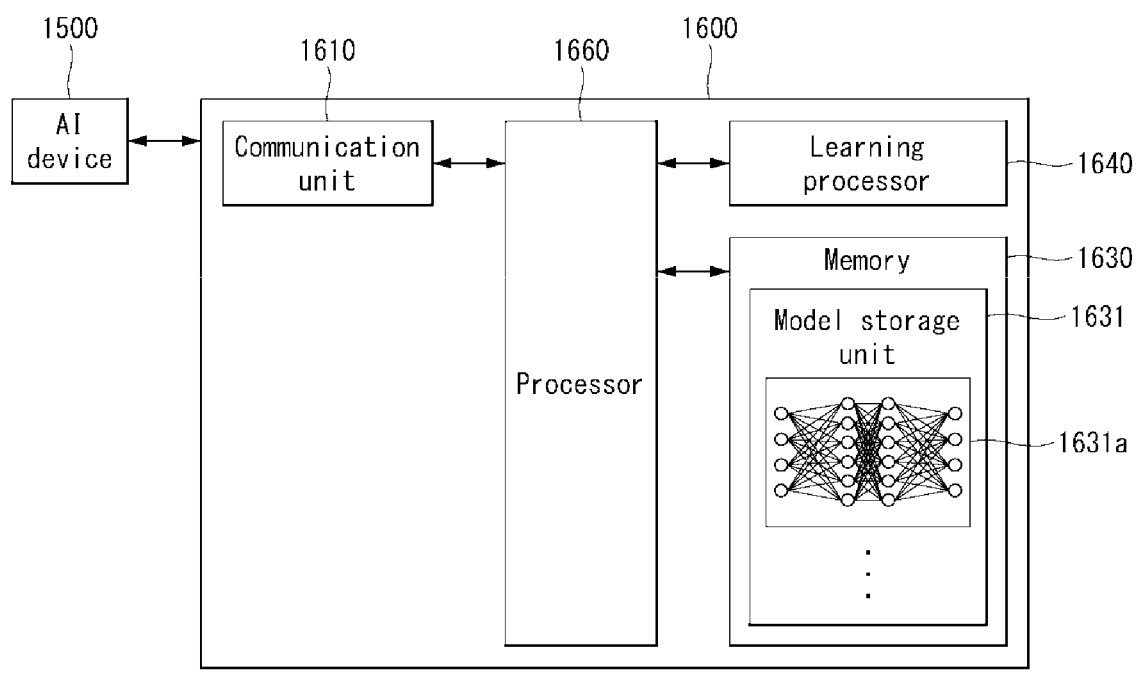

[FIG. 17]
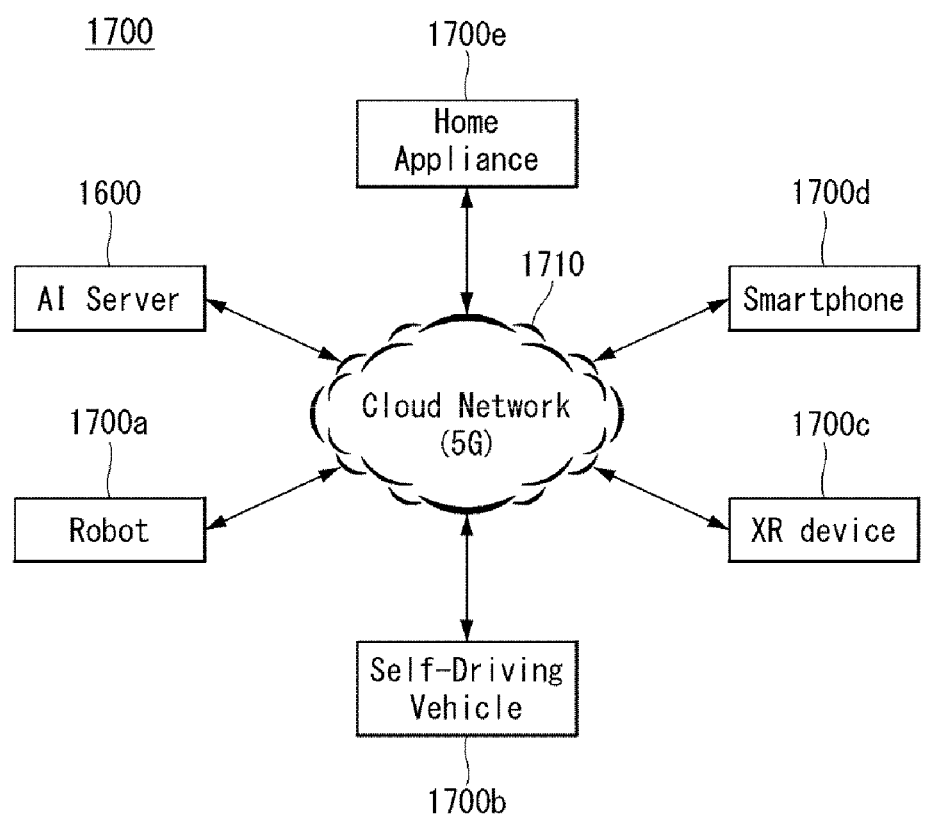

TRANSMISSION/RECEPTION METHOD IN 1-BIT QUANTIZATION SYSTEM, AND DEVICE THEREFOR

CROSS-REFERENCE TO RELATED APPLICATIONS

This application is the National Stage filing under 35 U.S.C. 371 of International Application No. PCT/KR2019/008141, filed on Jul. 3, 2019, the contents of which are incorporated herein by reference in its entirety.

TECHNICAL FIELD

The present disclosure relates to a wireless communication system, and more particularly, to a transmitting and receiving method in a communication system based on 1-bit quantization (quantization) and an apparatus supporting the same.

BACKGROUND ART

Mobile communication systems have been developed to provide voice services, while ensuring the activities of users. However, coverage of the mobile communication systems has extended up to data services, as well as voice service. Today, an explosive increase in traffic has caused the shortage of resources. There is a need for an advanced mobile communication system because users want relatively high speed services.

Requirements for a next-generation mobile communication system include the accommodation of explosive data traffic, a significant increase in the transfer rate per user, the accommodation of a greatly increased number of connection devices, very low end-to-end latency, and high energy efficiency. To this end, various technologies, such as dual connectivity, massive multiple input multiple output (MIMO), in-band full duplex, non-orthogonal multiple access (NOMA), super wideband, and device networking, are researched.

DISCLOSURE

Technical Problem

The present disclosure proposes a method of transmitting and receiving a signal based on 1-bit quantization considering energy efficiency.

Specifically, the present disclosure proposes a data transmitting and receiving method and a channel quality measurement method using a 1-bit differential phase shift modulation and demodulation technique based on a single carrier.

In addition, the present disclosure proposes a link adaptive transmission/reception technique using the measured channel quality.

Technical tasks to be achieved in the present disclosure are not limited to the technical tasks mentioned above, and other technical tasks not mentioned will be clearly understood by those with ordinary knowledge in the technical field to which the present disclosure belongs from the description below.

Technical Solution

According to In a wireless communication system according to an embodiment of the present disclosure, there is provided a method for transmitting and receiving a signal by a receiving apparatus, the method including: receiving, from a transmitting apparatus, signals modulated based on a differential phase shift keying (DPSK) method through a plurality of reception paths; calculating a differential value in each reception path of the plurality of reception paths based on the received signals; and calculating reliability for the received signals, in which the reliability is proportional to a real value of a sum of the differential values in each reception path of the plurality of reception paths.

In the method according to the embodiment of the present disclosure, the reliability may be proportional to the number of the plurality of reception paths of the receiving apparatus.

In the method according to the embodiment of the present disclosure, it may be interpreted that the more a case where the differential value in each reception path of the plurality of reception paths corresponds to either one of 1 or −1, the higher the reliability.

In the method according to the embodiment of the present disclosure, the method may further include calculating a channel quality, in which the channel quality may be calculated as a real value of values obtained by receiving two consecutive reference signals through all the reception paths of the receiving apparatus and summing differential values in each reception path of all the reception paths based on the two consecutive reference signals.

In the method according to the embodiment of the present disclosure, the channel quality may be related to the number of all the reception paths of the receiving apparatus.

In the method according to the embodiment of the present disclosure, a maximum value of the channel quality corresponds to a positive value of the number of all the reception paths, a minimum value thereof corresponds to a negative value of the number of all the reception paths, and a range of the channel quality is in a range of the minimum value to the maximum value.

In the method according to the embodiment of the present disclosure, the method may further include receiving a maximum value in a range of the channel quality from the transmitting apparatus.

In the method according to the embodiment of the present disclosure, when the calculated value of the channel quality is greater than the maximum value of the range of the channel quality, the maximum value of the range of the channel quality may be reported, and when the calculated value is less than a negative value of the maximum value of the range of the channel quality, the negative value of the maximum value of the range of the channel quality may be reported.

In the method according to the embodiment of the present disclosure, the method may further include receiving information on the number of times to transmit a reference signal for measuring the channel quality from the transmitting apparatus when the maximum value of the range of the channel quality is greater than the number of all the reception paths, in which the channel quality may be calculated by measuring and summing channel quality corresponding to a multiple of the number of times the reference signal is transmitted.

In the method according to the embodiment of the present disclosure, the information may be received through a physical layer signal or higher layer signaling.

The method may further include receiving information on the number of times to repeat the calculating of the channel quality, in which the channel quality may be reported as an average value of channel quality values measured by repeating the calculating of the channel quality based on the information on the number of repetitions.

In the method according to the embodiment of the present disclosure, an operation of repeating the calculating of the channel quality may be triggered by one of the transmitting apparatus or the receiving apparatus.

In the method according to the embodiment of the present disclosure, the method may further include transmitting the number of all the reception paths of the receiving apparatus to the transmitting apparatus upon initial connection.

In a wireless communication system according to another embodiment of the present disclosure, there is provided an apparatus for transmitting and receiving a signal in a wireless communication system, the apparatus including: a radio frequency (RF) unit configured to transmit or receive a radio signal; and a processor operatively connected to the RF unit, in which the processor receives signals modulated based on a differential phase shift keying (DPSK) method through a plurality of reception paths, calculates a differential value in each reception path of the plurality of reception paths based on the received signals, and calculates reliability for the received signals, and the reliability is proportional to a real value of a sum of the differential values in each reception path of the plurality of reception paths.

In the apparatus according to the embodiment of the present disclosure, the plurality of reception paths may include a plurality of antennas, and the reliability may be proportional to the number of the plurality of antennas.

In the apparatus according to the embodiment of the present disclosure, each reception path of the plurality of reception paths may include a 1-bit analog to digital converter (ADC).

Advantageous Effects

According to an embodiment of the present disclosure, it is possible to improve the power consumption of the system through the transmitting and receiving method based on 1-bit quantization.

Effects which may be obtained in the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 is a diagram illustrating an example of a block diagram of a transmitting end and a receiving end.

FIG. 7 illustrates an example of a receiving apparatus including a 64×64 two-dimensional antenna and a 1-bit analog to digital converter (ADC) connected to each antenna.

FIG. 8 illustrates an example in which DBPSK modulation is performed.

FIG. 9 illustrates an example of a result of passing a coded signal received by the receiving apparatus through the 1-bit ADC.

FIG. 10 illustrates an example of a symbol structure.

FIG. 11 illustrates an example of an operation flowchart of a device for transmitting and receiving a signal based on a 1-bit quantization to which method and embodiment proposed in the present disclosure may be applied.

FIG. 12 illustrates another example of an operation flowchart of a device for transmitting and receiving a signal based on the 1-bit quantization to which the method and embodiment proposed in the present disclosure may be applied.

FIG. 13 illustrates a block diagram of a wireless communication device to which the methods proposed in the present disclosure may be applied.

FIG. 14 is another example of a block diagram of a wireless communication device to which the methods proposed in the present disclosure may be applied.

FIG. 15 illustrates an AI device 1500 according to an embodiment of the present disclosure.

FIG. 16 illustrates an AI server 1600 according to an embodiment of the present disclosure.

FIG. 17 illustrates an AI system 1700 according to an embodiment of the present disclosure

MODE FOR DISCLOSURE

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

<Extended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

DEFINITION OF TERMS eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

System General

FIG. 1 illustrates an example of an overall structure of a new radio (NR) system to which a method proposed by the present specification is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and frame structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$, where $\Delta f_{max}=480 \cdot 10^3$, and $N_f=4096$ Downlink and uplink transmissions are organized into radio frames with a duration of $T_f=(\Delta f_{max} N_f/100) \cdot T_s=10$ ms. The radio frame consists of ten subframes each having a section of $T_{sf}=(\Delta f_{max} N_f/1000) \cdot T_s=1$ ms. In this case, there may be a set of frames in the uplink and a set of frames in the downlink.

FIG. 2 illustrates a relation between a UL frame and a DL frame in a wireless communication system to which a method proposed by the present disclosure is applicable.

As illustrated in FIG. 2, a UL frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe, and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Frequency shift, Average received power, and Received Timing.

FIG. 4 illustrates an example of a resource grid supported in a wireless communication system to which a method proposed in the disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l) where k=0, ..., $N_{RB}^\mu N_{sc}^{RB}-1$ is an index on a frequency domain, and l=0, ..., $2^\mu N_{symb}^{(\mu)}-1$ refers to a location of a symbol in a subframe. The index pair (k,l) is used to refer to a resource element in a slot, where l=0, ..., $N_{symb}^\mu-1$.

The resource element (k,l) for the numerology μ and the antenna port p corresponds to a complex value $a_{k,l}^{(p,\mu)}$. When there is no risk for confusion or when a specific antenna port or numerology is not specified, the indices p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^\mu$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Meanwhile, a PRB grid of each numerology supported by the carrier, BWP setting (up to 4 BWP supported) in each DL/UL carrier, code block group (CBG) setting, a transmission power control (TPC) per cell group, a HARQ process, a scrambling/sequencing related parameter, or the like may be set at a carrier level. A control resource set (set per cell, but associated per BWP), resource allocation related parameters and DM-RS configuration, CSI-RS related parameters, SRS resource set, HARQ-ACK and schedule request (SR) resource, set UL grant, or the like may be set at a BWP step.

Enhanced Mobile Broadband Communication (eMBB)

In the case of the NR system, a massive MIMO environment in which transmission and reception antennas are greatly increased may be considered. That is, as the massive MIMO environment is considered, the number of transmit/receive antennas may increase to tens or hundreds or more. In the massive MIMO environment, in order to reduce hardware implementation complexity, increase performance using multiple antennas, facilitate flexibility in resource allocation, and facilitate beam control for each frequency, a hybrid type beamforming in which an analog beamforming technique and a digital beamforming technique are combined according to a position where a beamforming weight vector/precoding vector is applied technique is required.

FIG. 6 is a diagram illustrating an example of a block diagram of a transmitting end and a receiving end.

As illustrated in FIG. 6, when a transmission path is used, each element of a sub-array may have a phase shift applied directly to an RF domain, but a digital beamforming technique based on a complex weight vector may be applied to a signal that supplies each sub-array. The receiving end may receive a signal through a plurality of antennas and output a final signal through an analog to digital converter (ADC), a demodulator, a decoder, and the like. The final signal may be output as a differential signal in consideration of noise and signal amplification.

FIG. 7 illustrates an example of a receiving apparatus including a 64×64 two-dimensional antenna and a 1-bit analog to digital converter (ADC) connected to each antenna. Here, a radio frequency (RF) front-end in the front stage of the ADC is omitted. FIG. 7 is only for convenience of description, and does not limit the scope of the present disclosure.

Referring to FIG. 7, for example, the receiving apparatus includes 4096 (for example, 64×64) antennas, and may include each 1-bit ADC for an I (in-phase) signal (real signal) of a reception path (RX path) connected to each antenna and a Q (quadrature) signal (for example, an imaginary signal).

In the receiving apparatus including the existing high-performance ADC, a received signal in the form of a+bj (for example, a and b is a number expressed by 8 bits to 10 bits, respectively) was transmitted to the baseband as the output of the high-performance ADC. Hereinafter, the output signal of the existing high-performance ADC will be referred to as an unquantized version. The high-performance ADC is excellent in terms of resolution of an output signal, but may be disadvantageous in terms of system power consumption.

Meanwhile, referring to FIG. 7, the types of signals transmitted to the baseband through the 1-bit ADC may be limited to four types per reception path. That is, one signal among 1+j, 1−j, −1+j, and −1+j may be received for each reception path. Although it may be difficult for the receiving apparatus including the 1-bit ADC to obtain information such as signal to noise ratio (SNR) due to information loss such as the size of the received signal, information transmission through phase information may be easy and the power consumption of the system is much lower than that of high-performance ADC.

In the present disclosure, based on a modulation technique of a differential phase shift modulation method (for example, Differential Binary Phase Shift Keying (DBPSK), Differential Quadrature Phase Shift Keying (DQPSK), or the like), and a demodulation technique of non-coherent detection method, a transmitting and receiving method in a 1-bit quantization system is proposed. The 1-bit quantization system may use the 1-bit ADC, and thus, may be replaced with the term such as 1-bit ADC system. Hereinafter, for convenience of explanation, a Differential BPSK (DBPSK) method will be used as the basis. However, this is only for convenience of description, and does not limit a technical idea of present disclosure. Therefore, it is obvious that the DQPSK method may be equally applied.

The differential phase shift modulation (Differential Phase Shift Keying, DPSK) is a modulation method for transferring data based on the phase difference of carriers between consecutive symbols. For example, in the differential BPSK (DBPSK), it is possible to transmit "1" by adding 180° to a current phase and transmit "0" by adding 0° to the current phase. In the differential QPSK (DQPSK), a phase shift may correspond to 0°, 90°, 180°, and −90° corresponding to data "00", "01", "11", and "10". In the receiving apparatus, demodulation is possible when only the phase difference between adjacent symbols is known.

FIG. 8 illustrates an example in which the DBPSK modulation is performed. In order to transmit 0 in the DBPSK modulation, the same symbol as the symbol modulated in the previous symbol is transmitted. To transmit 1, a symbol is transmitted by applying a phase difference of π from the previous symbol. Referring to FIG. 8, the transmitting apparatus may continuously transmit 1,1 to transmit 0, and may continuously transmit 1,0 to transmit 1. While the transmitting apparatus transmits a signal, it may be assumed that a coherence time is the same, that is, the channel does not change and is the same. Hereinafter, for convenience of description, it is assumed that when b=0, that is, 1 and 1 are continuously transmitted. However, this is only for convenience of description, and does not limit the technical idea of present disclosure.

FIG. 9 illustrates an example of a result of passing a coded signal received by the receiving apparatus through the 1-bit ADC. It may be assumed that the coded signal is a signal modulated by the DBPSK method.

Referring to FIG. 9, in the case of a reception path 1 (RX1), −1+j is received in the t-th symbol, and −1+j is also received in the t+1-th symbol. Accordingly, on the assumption that the channels between the two are the same, the receiving apparatus may determine that 0 has been received through decoding, and a differential value at this time may be output as 2. That is, the differential value may be expressed as a product of a conjugate value of a value received in the t-th symbol and a value received in the t+1 symbol. In the case of a reception path 2 (RX2), after passing through the channel similarly, −1−j is received in both the t-th symbol and the t+1 symbol, and a differential value of 2 may be output. Therefore, the receiving apparatus may assume that the transmitting apparatus has transmitted b=0.

<Method 1>

As described above, the transmitting and receiving method in the 1-bit ADC system may transmit one of four values to the baseband, unlike the existing non-quantization version. As the signal passes through 1-bit ADC, all signal magnitude information is lost, and while phase information is quantized into four types, the information loss may occur. Nevertheless, under the assumption that the channels are the same from the viewpoint of non-coherent detection, data detection is possible using only the phase change of two consecutive symbols. Therefore, the receiving apparatus in the 1-bit ADC system needs to consider a new receiving technique.

In general, the receiving apparatus performs decoding on coded bits that have undergone channel coding. Therefore, it is necessary to calculate a log-likelihood ratio (LLR) value indicating reliability of the received coded bits.

Equation 3 represents an LLR when a bit x encoded at a time index k is received as y through the decoder.

$$L(x_k/y_k) = \ln\frac{P(x_k=1/y_k)}{P(x_k=-1/y_k)}$$ [Equation 3]

$$L(y_k/x_k) = \ln\frac{P(y_k/x_k=+1)}{P(y_k/x_k=-1)} = \ln\frac{e^{-\frac{E_b}{N_0}(y_k-a)^2}}{e^{-\frac{E_b}{N_0}(y_k+a)^2}} = 4\frac{E_b}{N_0}ay_k$$

As illustrated in Equation 3, a signal to noise ratio (SNR) information is essential for the LLR calculation, but since it is difficult to obtain the SNR in a 1-bit ADC system, it may also be difficult to obtain an accurate LLR value.

Therefore, it is necessary to consider a method for calculating the reliability (for example, LLR) in the 1-bit ADC system.

In the 1-bit ADC system, the reliability of the received coded bit may be calculated using a signal received through each of a plurality of reception paths (for example, all reception paths). For example, as in the example of the receiving apparatus of FIG. 7 described above, it may be assumed that there are 4096 reception paths. A differential value of two consecutive symbols modulated with DBPSK received in each reception path may be one of {2, 2j, −2, −2j} as described above. It may be assumed that the differential values for the 4096 reception paths are as illustrated in Table 4 (it may be expressed by normalizing each differential value to ½ value).

Referring to Table 4, in a reception path having a differential value of 1, it may be determined that the coded bit is 0, and when the differential value is −1, it may be determined that the coded bit is 1. Moreover, in the case of a reception path having a differential value of j or −j, it may be seen that the received bit has no reliability because the probability that the coded bit is 0 or 1 is half and half.

Therefore, in the 1-bit ADC system environment, the LLR value may be expressed by Equation (4). Here, Zk denotes a differential value of a signal output from a k-th reception path.

$$LLR \propto \Sigma_{k=1}^{4096} \text{Re}\{Zk\}$$ [Equation 4]

Referring to Equation 4, the LLR value of the coded bit may be proportional to the sum of real values of the differential values of signal output from each reception path of a plurality of reception paths (for example, all reception paths) of the receiving apparatus. That is, the LLR value of the coded bit may be proportional to the real value of the sum of signals outputs from each reception path of the plurality of reception paths (for example, all reception paths) of the receiving apparatus.

The receiving apparatus may determine that the same signal has been received as the number of differential values of the signals output from each reception path is greater than 1, and as the number of −1 is greater, the receiving apparatus may determine that the inverted signal has been received. When the LLR is 0, it may be determined that the reliability of the received signal is low because the case where 1 is received and the case where −1 is received are half and half. Accordingly, from the data detection point of view, it may be said that the received bit has the highest reliability when the Zk values are all 1 or all −1. Through the above-described LLR calculation method, the receiving apparatus may perform data decoding.

In addition, since the LLR value is proportional to the sum of the real values of the differential values of each signal output from each reception path of the plurality of reception paths (for example, all reception paths) of the receiving apparatus, the reliability of the received signal may be proportional to the number (for example, the number of antennas) of the plurality of reception paths (for example all reception paths) of the receiving apparatus. For the same signal, it may be determined that the reliability of the received signal is high as the result of receiving the same signal from each antenna is the same. In addition, the weight of the LLR may be adjusted according to the number of reception paths (for example, the number of antennas) of the receiving apparatus. For example, the greater the number of antennas of the receiving apparatus, the greater the weight for the calculated LLR value may be applied.

<Method 2>

As described above, it may be confirmed that the reliability of data transmitted through the DBPSK is proportional to the LLR value of the reception path, that is, the correlation between the values of Zk. Therefore, by identifying a degree of this correlation through a consecutive reference signal (RS) and reporting the degree to the trans-

TABLE 4

| RX | RX1 | RX2 | RX3 | ... | RX4093 | RX4094 | RX4095 | RX4096 |
|---|---|---|---|---|---|---|---|---|
| Differential signal value | 1 | 1 | −1 | −1 j | −j | 1 | 1 | 1 | mitting apparatus, the transmitting apparatus and the receiving apparatus may adjust the data transfer adaptively to the channel quality.

Hereinafter, a method for measuring and reporting channel quality for an adaptive link technique in the 1-bit ADC system based on differential modulation and demodulation will be described.

FIG. 10 illustrates an example of a symbol structure. Referring to FIG. 10, a known reference signal may be transmitted continuously. A method of calculating channel quality based on a continuously transmitted reference signal may be considered.

In the present disclosure, channel quality in a 1-bit ADC system will be referred to as spatially aggregated channel quality (SACQ) (hereinafter, SACQ).

Equation 5 illustrates an equation for calculating the SACQ. The SACQ may be defined as a real value of the sum of differential signal values of all reception paths that receive reference signals of two consecutive identical symbols and have received them.

$$SACQ = Real(\Sigma_{k=1}^{N} Q_k) \qquad \text{[Equation 5]}$$

Here, Ok denotes a differential value of an output signal based on a consecutive reference signal received in each reception path.

For example, when two consecutive modulated symbols are transmitted with 1,1, the differential value of each reception path of the receiving apparatus may be one of $\{1, -1, j, -j\}$ (normalized). In addition, when two consecutive modulated symbols are transmitted with 1 and −1, the same difference values may be obtained by multiplying the final value by −1. In addition, multiples of the total value are also possible.

As a specific example, when two consecutive modulated reference signal symbols are transmitted as 1 and 1, the receiving apparatus may determine that the channel state is good when the differential value is 1 (normalized). Meanwhile, when the differential value is −1 (normalized), since the transmitted signal is inverted and received, it may be determined that the channel state is bad or the SNR is bad.

When the number of reception paths connected to 1-bit ADC is N (for example, N is a natural number) in the receiving apparatus, the maximum value of SACQ is N, and the minimum value may correspond to −N. The SACQ value may depend on the number N of reception paths. That is, the maximum value, minimum value, and range of channel quality (for example, SACQ) may vary depending on the number of reception paths connected to the 1-bit ADC. For example, a receiving apparatus having 4096 (N=4096) reception paths may have the maximum value of 4096, the minimum value of −4096, and the range of −4096 to 4096 in the SACQ value. The receiving apparatus having 256 (N=256) reception paths may have the maximum value of 256, the minimum value of −256, and the range of −256 to 256 in the SACQ value. Accordingly, from the viewpoint of reliability of the received coded bits, it may be said that the case in which the SACQ has a value of 4096 is higher than the case where the SACQ has a value of 256.

In order to support the SACQ values of receiving apparatus having different number of reception paths (for example, N) in the system in performing channel quality measurement and reporting for the adaptive link technique in the 1-bit ADC system, the transmitting apparatus and the receiving apparatus may transmit/receive information related to the SACQ.

For example, the receiving apparatus may receive the SACQ range set from the transmitting apparatus. The transmitting apparatus may inform the receiving apparatus of the maximum value (for example SACQ_max or N_req, or the like) of SACQ as system information through a broadcast method. Here, the maximum value (for example SACQ_max or N_req, or the like) of SACQ indicates the number of reception paths including the 1-bit ADC determined to have the highest spectral efficiency.

Alternatively, the receiving apparatus may transmit the number of their reception paths to the transmitting apparatus upon initial connection.

Alternatively, by combining the above cases, the receiving apparatus may receive the maximum value (for example SACQ_max or N_req, or the like) of SACQ from the transmitting apparatus, and transmit the number of the own reception path to the transmitting apparatus.

Alternatively, the receiving apparatus transmit the number of their reception paths to the transmitting apparatus, and the transmitting apparatus may set the maximum value of SACQ and/or the range of SACQ to the receiving apparatus based on the number of reception paths of the received receiving apparatus.

The transmitting apparatus transmits a known consecutive reference signal of two symbols for measuring the SACQ to the receiving apparatus, and the receiving apparatus receiving the reference signal may report each SACQ value. When the SACQ value to be reported is larger than the maximum value (for example SACQ_max or N_req, or the like) of SACQ set by the transmitting apparatus, it may be reported as SACQ_max. When the SACQ value to be reported is smaller than the −SACQ_max value, it may be reported as −SACQ_max.

As a specific example, it may be assumed that the SACQ_max value set by the transmitting apparatus is 64, one receiver has 16 reception paths, and another receiver has 128 reception paths. In this case, the range of the SACQ value of the receiver having the 16 reception paths may correspond to −16 to 16. Meanwhile, in the case of the receiver with 128 reception paths, the receiver may have the SACQ value in the range of −128 to 128, and when the actual measured value is less than −64, it may be reported as −64, and when the actual measured value is larger than 64, it may be reported as 64.

As described above, the calculated SACQ value itself may be transmitted to the transmitting apparatus. Alternatively, the SACQ value may be mapped to a specific function and transmitted to the transmitting apparatus as feedback information. For example, it may be mapped and transmitted in the form of f(SACQ, others) (here, f represents a function).

The range of the SACQ value may depend on the number of reception paths of the receiving apparatus. When the number of the reception paths of the receiving apparatus is small, it may occur that the range of the SACQ value set by the system cannot be reached. For example, when the maximum and minimum values of the SACQ values set by the system are 64 and −64, respectively, the receiving apparatus having 16 reception paths may not satisfy the maximum spectral efficiency set by the system. Therefore, it is necessary to consider a method for extending the range of the SACQ value.

In one example, the transmitting apparatus may continuously transmit a reference signal for SACQ measurement M+1 times (M is a natural number), and the receiving apparatus may receive the reference signals transmitted M+1 times and the SACQ value as much as M times (M×the number of reception paths) the number of reception paths. A final SACQ value may be calculated by adding the measured SACQ values. In this case, the M value may be signaled between the transmitting apparatus and the receiving apparatus, and may be set through a specific physical layer signal or higher layer signaling of the receiving apparatus. Signaling for SACQ accumulation may be triggered by the transmitting apparatus or by the receiving apparatus.

As a specific example, it may be assumed that the receiving apparatus has 16 reception paths, and the maximum value of the set SACQ value is 64. In this case, since the receiving apparatus cannot satisfy the range of the SACQ value set by the system, it is possible to expand the SACQ value according to the above-described method. When M=4, the transmitting apparatus may transmit a known reference signal a total of 5 times, and the receiving apparatus may calculate the SACQ value of 4 times in the time domain from the differential signal. The SACQ value in the range of −64 to 64 may be obtained by adding total of four SACQs.

Alternatively, a length of the reference signal for SACQ measurement may be linked to the number of reception paths of the receiving apparatus. For example, when the number of reception paths of the receiving apparatus is N, and the SACQ_max set by the transmitting apparatus corresponds to M times (N×M) of the number of the reception paths, the transmitting apparatus may transmit by adjusting the length of the reference signal for SACQ measurement in consideration of the M value. The transmitting apparatus may transmit a reference signal corresponding to (M+1) times the length of the reference signal when SACQ_max is N. As a specific example, when the SACQ_max value is 128 and there are 16 reception paths, M=8 may be set, the transmitting apparatus may transmit a reference signal of a length corresponding to 9 times the reference signal when the SACQ_max value is 16, and the receiving apparatus may receive a total of 9 known reference signals, and measure and report the reference signals.

The reliability of the SACQ value may be determined by the number of repetitions of a known reference signal. However, in a case where two known reference signals are adjacent symbols, even when the SACQ measurement is repeated several times, it may be considered that the reliability of the SACQ value itself is not great. Therefore, there is a need for a method to increase the reliability of the SACQ value itself.

As an example, the transmitting apparatus may continuously transmit the reference signal for SACQ measurement M+1 times, and the receiving apparatus may measure the SACQ value M times and obtains an average of the measured SACQ values, thereby increasing the reliability of the SACQ value itself. In this case, M may be set through a specific physical layer signal or higher layer signaling of the receiving apparatus between the transmitting apparatus and the receiving apparatus. Signaling for the SACQ accumulation may be triggered by the transmitting apparatus or by the receiving apparatus.

As a specific example, it may be assumed that the receiving apparatus has 64 reception paths and the SACQ_max value is 64. Since the number of reception paths of the receiving apparatus satisfies the SACQ_max range, it is possible to calculate the SACQ value by performing the SACQ measurement once. However, in order to increase the reliability of the SACQ value itself, the SACQ measurement may be repeated. For example, when M=3, the transmitting apparatus may transmit a known reference signal a total of 4 times, and the receiving apparatus may measure the SACQ 3 times in the time domain from the differential value of the output signal. By calculating the average value of the SACQs measured three times, a more reliable SACQ value in the range of −64 to 64 may be obtained compared to the existing SACQ value.

Signal transmission and reception in the 1-bit ADC system is possible through the above-described methods and embodiments, and the data transfer rate may be adaptively adjusted in the 1-bit ADC system based on differential modulation and demodulation by measuring and reporting channel quality (for example, SACQ) using a known consecutive reference signal.

FIG. 11 illustrates an example of an operation flowchart of a device for transmitting and receiving a signal based on a 1-bit quantization to which method and embodiment proposed in the present disclosure may be applied. FIG. 11 is only for convenience of description, and does not limit the scope of the present disclosure.

Referring to FIG. 11, it is assumed that the transmitting apparatus and/or receiving apparatus are operated based on Method 1 and 2 and/or the embodiments described above.

The receiving apparatus may receive signals modulated based on a differential phase shift keying (DPSK) method from the transmitting apparatus through a plurality of reception paths (S1110). For example, each reception path of the plurality of reception paths may include a 1-bit analog to digital converter (ADC). The types of signals transmitted to a baseband through the 1-bit ADC may be limited to four per reception path. That is, one signal among 1+j, 1−j, −1+j, and −1+j may be received for each reception path.

The receiving apparatus may calculate a differential value in each reception path of the plurality of reception paths based on the received signals (S1120). For example, a differential value of two consecutive symbols modulated with DBPSK received through the 1-bit ADC of each reception path of the plurality of reception paths may be one value of {2, 2j, −2, −2j}, and it can be normalized and expressed as one of {1, j, −1, −j}.

Reliability of the received signals may be calculated (S1130). The reliability may be calculated based on Method 1 described above. Specifically, the reliability may be proportional to a real value of a sum of differential values in each reception path of the plurality of reception paths. It may be interpreted that he more a case where the differential value in each reception path of the plurality of reception paths corresponds to either one of 1 or −1, the higher the reliability. In addition, since the reliability is proportional to a real value of a sum of differential values in each reception path of the plurality of reception paths, the reliability may be proportional to the number (for example, the number of antennas) of the plurality of reception paths of the receiving apparatus. In addition, it is possible to adjust the weight of the LLR according to the number (for example, the number of antennas) of the plurality of reception paths of the receiving apparatus. The receiving apparatus may perform data decoding based on the reliability.

FIG. 12 illustrates another example of the operation flowchart of the device for transmitting and receiving the signal based on the 1-bit quantization to which the method and embodiment proposed in the present disclosure may be applied. FIG. 12 is only for convenience of description, and does not limit the scope of the present disclosure.

Referring to FIG. 12, it is assumed that the transmitting apparatus and/or receiving apparatus are operated based on Method 1 and 2 and/or the embodiments described above.

The receiving apparatus may transmit or receive information related to spatially aggregated channel quality (SACQ) (S1210).

As an example, the receiving apparatus may receive the SACQ range set from the transmitting apparatus. The receiving apparatus may receive the maximum value (for example, SACQ_max or N_req, or the like) of SACQ indicating the number of reception paths including the 1-bit ADC determined to have the highest spectral efficiency. Alternatively, the receiving apparatus may transmit the number of the reception paths of the receiving apparatus to the transmitting apparatus upon initial connection. Alternatively, the receiving apparatus may transmit the number of reception paths of the receiving apparatus to the transmitting apparatus, and the transmitting apparatus may set the maximum value of the SACQ and/or the range of SACQ to the receiving apparatus based on the number of received reception paths of the receiving apparatus.

As another example, the transmitting apparatus may receive information related to how many times the transmitting apparatus continuously transmits the reference signal for SACQ measurement. As a specific example, when the number of reception paths of the receiving apparatus is smaller than the set SACQ range (for example, M times the number of reception paths), the transmitting apparatus may continuously transmit the reference signal for SACQ measurement M+1 times (M is a natural number) so as to measure the channel quality corresponding to the set SACQ range. The M value may be preset between the transmitting apparatus and the receiving apparatus.

As another example, information related to the length of the reference signal for SACQ measurement may be received. As a specific example, when the number of reception paths of the receiving apparatus is N, and the SACQ_max set by the transmitting apparatus corresponds to M times (N×M) of the number of the reception paths, the transmitting apparatus considers the M value, SACQ_max It is possible to transmit a reference signal corresponding to (M+1) times the length of the reference signal when is N. The M value may be preset between the transmitting apparatus and the receiving apparatus.

As another example, information on the number of times a known reference signal is repeatedly transmitted to improve reliability of the SACQ value may be received. As a specific example, the transmitting apparatus may repeatedly transmit the reference signal for SACQ measurement M+1 times, and the receiving apparatus measures the M times SACQ value and obtains the average of the measured SACQ values to increase the reliability of the SACQ value itself. The M value may be preset between the transmitting apparatus and the receiving apparatus.

The receiving apparatus may receive two consecutive reference signals (reference signal) from the transmitting apparatus through all reception paths of the receiving apparatus (S1220). The two consecutive reference signals may be modulated in a DPSK scheme.

The receiving apparatus may calculate a spatially aggregated channel quality (SACQ) as a real value of the summed values by calculating a differential value in each reception path based on the reference signal (S1230). The channel quality may be related to the number of all the reception paths of the receiving apparatus. The maximum value of the channel quality may correspond to a positive value of the number of all the reception paths, and the minimum value thereof may correspond to a negative value of the number of all the reception paths. In addition, the range of the channel quality may correspond to a range of the minimum value to the maximum value.

The channel quality (SACQ) may be measured based on information set in Step S1210. As a specific example, when the transmitting apparatus receives information that the reference signal for SACQ measurement is continuously transmitted M+1 times (M is a natural number), the receiving apparatus may calculate the channel quality by a value obtained by measuring the channel quality M times and summing the measured values. Alternatively, when information that the transmitting apparatus repeatedly transmits the reference signal M+1 times is received to improve the reliability for the SACQ, the receiving apparatus repeats the channel quality measurement M times and calculates the channel quality with an average value.

The receiving apparatus may report the measured channel quality (SACQ) to the transmitting apparatus (S1240). Based on the channel quality (SACQ), the transmitting apparatus and the receiving apparatus may adjust the data rate adaptively to the channel quality.

The receiving apparatus may receive a data signal from the transmitting apparatus (S1250). The data signal may be a signal modulated by DPSK. The data signal may be a data signal of which a code rate is adjusted based on the channel quality (SACQ). Moreover, Step S1250 may correspond to Step S1110 of FIG. 11. Subsequent operations may correspond to steps S1110 to S1130 of FIG. 11, and thus, repeated descriptions will be omitted.

General Device to which Present Disclosure May Apply

FIG. 13 illustrates a block diagram of a wireless communication device to which the methods proposed in the present disclosure may be applied.

Referring to FIG. 13, the wireless communication system may include a first device 1310 and a second device 1320.

The first device 1310 may be a device related to a base station, a network node, a transmission terminal, a reception terminal, a transmitting apparatus, a receiving apparatus, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 1320 may be a device related to a base station, a network node, a transmission terminal, a reception terminal, a transmitting apparatus, a receiving apparatus, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the UE may include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 1310 may include at least one processor such as the processor 1311, at least one memory such as the memory 1312, and at least one transceiver such as the transceiver 1313. The processor 1311 may perform the above-described functions, procedures, and/or methods. The processor 1311 may perform one or more protocols. For example, the processor 1311 may perform one or more layers of a radio interface protocol. The memory 1312 is connected to the processor 1311, and may store various forms of information and/or instructions. The transceiver 1313 is connected to the processor 1311, and may be controlled to transmit and receive radio signals.

As a specific example, the processor 1311 may control the transceiver 1313 to transmit a signal modulated by a differential phase shift keying (DPSK) method to the second device 1320 (S1110 and S1220). In addition, the processor 1311 may control the transceiver 1313 to transmit/receive information related to spatially aggregated channel quality (SACQ) to the second device 1320 (S1210). Also, the processor 1311 may control the transceiver 1313 to receive a spatially aggregated channel quality (SACQ) report from the second device 1320 (S1240).

The second device 1320 may include at least one processor such as a processor 1321, at least one memory device such as a memory 1322, and at least one transceiver such as a transceiver 1323. The processor 1321 may perform the functions, procedures, and/or methods described above. The processor 1321 may implement one or more protocols. For example, the processor 1321 may implement one or more layers of an air interface protocol. The memory 1322 is connected to the processor 1321 and may store various types of information and/or commands. The transceiver 1323 may be connected to the processor 1321 and may be controlled to transmit/receive a wireless signal.

As a specific example, the processor 1321 may control the transceiver 1323 to receive a signal modulated in the DPSK method through the 1-bit ADC from the first device 1310 (S1110), and transmit/receive information related to SACQ. can be (S1210).

In addition, the processor 1321 may calculate a differential value (differential value) based on the received signal (S1120), and may calculate reliability (reliability) for the received signal (S1130). The reliability may be calculated based on method 1 described above, and may be proportional to the sum of real values of differential values output from each reception path. Alternatively, a spatially aggregated channel quality (SACQ) may be calculated as a real value of the summed values by calculating a differential value in each reception path based on the reference signal (S1230).

Also, the processor 1321 may control the transceiver 1323 to report spatially aggregated channel quality (SACQ) to the first device 1310 (S1240).

FIG. 14 is another example of a block diagram of a wireless communication device to which the methods proposed in the present disclosure may be applied.

Referring to FIG. 14, a wireless communication system includes a base station 1410 and multiple UEs 1420 disposed within the base station region. The base station may be represented as a transmission device, and the UE may be represented as a reception device, and vice versa. The base station and the UE include processors 1411 and 1421, memories 1414 and 1424, one or more Tx/Rx radio frequency (RF) modules 1415 and 1425, Tx processors 1412 and 1422, Rx processors 1413 and 1423, and antennas 1416 and 1426, respectively. The processor implements the above-described functions, processes and/or methods. More specifically, in DL (communication from the base station to the UE), a higher layer packet from a core network is provided to the processor 1411. The processor implements the function of the L2 layer. In DL, the processor provides the UE 1420 with multiplexing between a logical channel and a transport channel and radio resource allocation, and is responsible for signaling toward the UE. The TX processor 1412 implements various signal processing functions for the L1 layer (i.e., physical layer). The signal processing function facilitates forward error correction (FEC) in the UE, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each of the space streams may be provided to a different antenna 1416 through an individual Tx/Rx module (or transmitter and receiver 1415). Each Tx/Rx module may modulate an RF carrier into each space stream for transmission. In the UE, each Tx/Rx module (or transmitter and receiver 1425) receives a signal through each antenna 1426 of each Tx/Rx module. Each Tx/Rx module restores information modulated in an RF carrier and provides it to the RX processor 1423. The RX processor implements various signal processing functions of the layer 1. The RX processor may perform space processing on information in order to restore a given space stream toward the UE. If multiple space streams are directed toward the UE, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the base station. Such soft decisions may be based on channel estimation values. The soft decisions are decoded and deinterleaved in order to restore data and a control signal originally transmitted by the base station on a physical channel. A corresponding data and control signal are provided to the processor 1421.

UL (communication from the UE to the base station) is processed by the base station 1410 in a manner similar to that described in relation to the receiver function in the UE 1420. Each Tx/Rx module 1425 receives a signal through each antenna 1426. Each Tx/Rx module provides an RF carrier and information to the RX processor 1423. The processor 1421 may be related to the memory 1424 storing a program code and data. The memory may be referred to as a computer-readable medium.

FIG. 15 illustrates an AI device 1500 according to an embodiment of the present disclosure.

The AI device 1500 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 15, the AI device 1500 may include a communication unit 1510, an input unit 1520, a learning processor 1530, a sensing unit 1540, an output unit 1550, a memory 1570, and a processor 1580.

The communication unit 1510 may transmit and receive data to and from external devices, such as other AI devices 1700a to 1700e or an AI server 1600, using wired and wireless communication technologies. For example, the communication unit 1510 may transmit and receive sensor information, a user input, a learning model, and a control signal to and from the external devices.

Examples of communication technologies used by the communication unit 1510 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 1520 may obtain various types of data.

The input unit 1520 may include a camera for an image signal input, a microphone for receiving an audio signal, a user input unit for receiving information from a user, etc.

Herein, the camera or the microphone is treated as a sensor, and thus a signal obtained from the camera or the microphone may be referred to as sensing data or sensor information.

The input unit 1520 can obtain learning data for model learning and input data to be used when an output is obtained using a learning model. The input unit 1520 can obtain not-processed input data. In this case, the processor 1580 or the learning processor 1530 can extract an input feature by performing pre-processing on the input data.

The learning processor 1530 may be trained by a model constructed by an artificial neural network using learning data. In this case, the trained artificial neural network may be called a learning model. The learning model may be used to deduce a result value of new input data not learning data, and the deduced value may be used as a base for performing a given operation.

The learning processor 1530 can perform AI processing along with a learning processor 1640 of the AI server 1600.

The learning processor 1530 may include a memory integrated or implemented in the AI device 1500. Alternatively, the learning processor 1530 may be implemented using the memory 1570, an external memory directly coupled to the AI device 1500, or a memory maintained in an external device.

The sensing unit 1540 can obtain at least one of internal information of the AI device 1500, surrounding environment information of the AI device 1500, or user information using various sensors.

Examples of sensors included in the sensing unit 1540 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 1550 can generate an output related to a visual sense, an auditory sense or a tactile sense.

The output unit 1550 may include a display for outputting visual information, a speaker for outputting auditory information, and a haptic module for outputting tactile information.

The memory 1570 can store data supporting various functions of the AI device 1500. For example, the memory 1570 can store input data obtained by the input unit 1520, learning data, a learning model, a learning history, etc.

The processor 1580 can determine at least one executable operation of the AI device 1500 based on information that is determined or generated using a data analysis algorithm or a machine learning algorithm. Furthermore, the processor 1580 can perform operation determined by controlling the components of the AI device 1500.

To this end, the processor 1580 can request, search, receive, or utilize data of the learning processor 1530 or the memory 1570, and can control the components of the AI device 1500 to execute a predicted operation or an operation determined to be preferred, among the at least one executable operation.

In this case, if association with an external device is necessary to perform the determined operation, the processor 1580 may generate a control signal for controlling the corresponding external device and transmit the generated control signal to the corresponding external device.

The processor 1580 can obtain intention information for a user input and transmit user requirements based on the obtained intention information.

The processor 1580 can obtain the intention information corresponding to the user input using at least one of a speech to text (STT) engine for converting a voice input into a text string or a natural language processing (NLP) engine for obtaining intention information of a natural language.

In this case, at least one of the STT engine or the NLP engine may be constructed by an artificial neural network of which at least a portion is trained according to a machine learning algorithm. Furthermore, at least one of the STT engine or the NLP engine may have been trained by the learning processor 1530, may have been trained by the learning processor 1640 of the AI server 1600, or may have been trained by distributed processing thereof.

The processor 1580 may collect history information including the feedback, etc. of the user for the operation contents or an operation of the AI device 1500, and may store the history information in the memory 1570 or the learning processor 1530 or may transmit the history information to an external device such as the AI server 1600. The collected history information may be used to update a learning model.

The processor 1580 may control at least some of the components of the AI device 1500 in order to run an application program stored in the memory 1570. Moreover, the processor 1580 may combine and operate two or more of the components included in the AI device 1500 in order to run the application program.

FIG. 16 illustrates an AI server 1600 according to an embodiment of the present disclosure.

Referring to FIG. 16, the AI server 1600 may refer to a device which is trained by an artificial neural network using a machine learning algorithm or which uses a trained artificial neural network. Herein, the AI server 1600 consists of a plurality of servers and may perform distributed processing and may be defined as a 5G network. Further, the AI server 1600 may be included as a partial configuration of the AI device 1500 and may perform at least a part of AI processing.

The AI server 1600 may include a communication unit 1610, a memory 1630, a learning processor 1640, and a processor 1660.

The communication unit 1610 may transmit and receive data to and from an external device such as the AI device 1500.

The memory 1630 may include a model storage unit 1631. The model storage unit 1631 may store a model (or artificial neural network 1631*a*) which is being trained or has been trained through the learning processor 1640.

The learning processor 1640 may train the artificial neural network 1631*a* using learning data. The learning model may be used in the state in which it has been mounted on the AI server 1600 of the artificial neural network, or may be mounted on an external device such as the AI device 1500 and used.

The learning model may be implemented as hardware, software or a combination of hardware and software. If a part or all of the learning model is implemented as software, one or more instructions constructing the learning model may be stored in the memory 1630.

The processor 1660 may deduce a result value of new input data using the learning model and generate a response or a control command based on the deduced result value.

FIG. 17 illustrates an AI system 1700 according to an embodiment of the present disclosure.

Referring to FIG. 17, in the AI system 1700, at least one of the AI server 1600, a robot 1700*a*, a self-driving vehicle 1700*b*, an XR device 1700*c*, a smartphone 1700*d*, or home appliances 1700*e* is connected to a cloud network 1710. The robot 1700*a*, the self-driving vehicle 1700*b*, the XR device 1700*c*, the smartphone 1700*d* or the home appliances 1700*e* to which the AI technology is applied may be called AI devices 1700*a* to 1700*e*.

The cloud network 1710 may constitute part of cloud computing infra or may mean a network present within cloud computing infra. The cloud network 1710 may be configured using the 3G network, the 4G or long term evolution (LTE) network, or the 5G network.

That is, the devices 1700*a* to 1700*e* and 200 constituting the AI system 1700 may be interconnected over the cloud network 1710. In particular, the devices 1700*a* to 1700*e* and 200 may communicate with each other through a base station, or may directly communicate with each other without the intervention of the base station.

The AI server 1600 may include a server for performing AI processing and a server for performing calculation on big data.

The AI server 1600 is connected to at least one of the robot 1700*a*, the self-driving vehicle 1700*b*, the XR device 1700*c*, the smartphone 1700*d* or the home appliances 1700*e*, that are AI devices constituting the AI system 1700, over the cloud network 1710, and may help at least part of the AI processing of the connected AI devices 1700*a* to 1700*e*.

The AI server 1600 can train an artificial neural network based on a machine learning algorithm in place of the AI devices 1700*a* to 1700*e*, and can directly store a learning model or transmit the learning model to the AI devices 1700*a* to 1700*e*.

The AI server 1600 can receive input data from the AI devices 1700*a* to 1700*e*, deduce a result value of the received input data using the learning model, generate a response or control command based on the deduced result value, and transmit the response or control command to the AI devices 1700*a* to 1700*e*.

Alternatively, the AI devices 1700*a* to 1700*e* can directly deduce a result value of input data using a learning model, and can generate a response or a control command based on the deduced result value.

Various implementations of the AI devices 1700*a* to 1700*e* to which the above-described technologies are applied are described below. Herein, the AI devices 1700*a* to 1700*e* illustrated in FIG. 17 may be considered as detailed implementations of the AI device 1500 illustrated in FIG. 15.

AI+Robot

The AI technology is applied to the robot 1700*a*, and the robot 1700*a* may be implemented as a guidance robot, a transport robot, a cleaning robot, a wearable robot, an entertainment robot, a pet robot, an unmanned aerial robot, etc.

The robot 1700*a* may include a robot control module for controlling an operation. The robot control module may mean a software module or a chip in which a software module is implemented using hardware.

The robot 1700*a* may obtain status information of the robot 1700*a*, detect (recognize) a surrounding environment and an object, generate map data, determine a moving path and a running plan, determine a response to a user interaction, or determine an operation, using sensor information obtained from various types of sensors.

The robot 1700*a* may use sensor information obtained by at least one sensor of LIDAR, a radar, and a camera in order to determine the moving path and the running plan.

The robot 1700*a* may perform the above operations using a learning model consisting of at least one artificial neural network. For example, the robot 1700*a* may recognize a surrounding environment and an object using the learning model, and determine an operation using the recognized surrounding environment information or object information. Herein, the learning model may have been directly trained in the robot 1700*a* or may have been trained in an external device such as the AI server 1600.

The robot 1700*a* may directly generate results using the learning model and perform an operation, but may perform an operation by transmitting sensor information to an external device such as the AI server 1600 and receiving results generated in response to this.

The robot 1700*a* may determine the moving path and the running plan using at least one of map data, object information detected from sensor information, or object information obtained from the external device. The robot 1700*a* may run along the determined moving path and running plan by controlling the driver.

The map data may include object identification information for various objects disposed in the space in which the robot 1700*a* moves. For example, the map data may include object identification information for fixed objects, such as a wall and a door, and movable objects, such as a flowerpot and a desk. Furthermore, the object identification information may include a name, a type, a distance, a location, etc.

Furthermore, the robot 1700*a* may perform an operation or run by controlling the driver based on a user's control/interaction. In this case, the robot 1700*a* may obtain intention information of interaction according to a user's behavior or voice utterance, may determine a response based on the obtained intention information, and may perform an operation.

AI+Self-Driving

The AI technology is applied to the self-driving vehicle 1700*b*, and the self-driving vehicle 1700*b* may be implemented as a mobile robot, a vehicle, an unmanned aerial vehicle, etc.

The self-driving vehicle 1700*b* may include a self-driving control module for controlling a self-driving function. The self-driving control module may mean a software module or a chip in which a software module has been implemented using hardware. The self-driving control module may be included in the self-driving vehicle 1700*b* as the component of the self-driving vehicle 1700*b*, but may be configured as separate hardware outside the self-driving vehicle 1700*b* and connected to the self-driving vehicle 1700*b*.

The self-driving vehicle 1700*b* may obtain status information of the self-driving vehicle 1700*b*, detect (recognize) a surrounding environment and object, generate map data, determine a moving path and a running plan, or determine an operation, using sensor information obtained from various types of sensors.

In order to determine the moving path and the running plan, the self-driving vehicle 1700*b* may use sensor information obtained from at least one sensor among LIDAR, a radar and a camera, in the same manner as the robot 1700*a*.

Particularly, the self-driving vehicle 1700*b* may recognize an environment or an object in an area in which a sight is blocked or an area of a predetermined distance or more by receiving sensor information from external devices, or may receive information that is directly recognized from the external devices.

The self-driving vehicle 1700*b* may perform the above operations using a learning model consisting of at least one artificial neural network. For example, the self-driving vehicle 1700*b* may recognize a surrounding environment and object using a learning model and determine a running path using the recognized surrounding environment information or object information. Herein, the learning model may have been directly trained in the self-driving vehicle 1700*b* or may have been trained in an external device such as the AI server 1600.

In this instance, the self-driving vehicle 1700*b* may directly generate results using the learning model to perform an operation, but may perform an operation by transmitting sensor information to an external device such as the AI server 1600 and receiving results generated in response to this.

The self-driving vehicle 1700*b* may determine a moving path and a running plan using at least one of map data, object information detected from sensor information, or object information obtained from an external device. The self-driving vehicle 1700*b* may run based on the determined moving path and running plan by controlling the driver.

The map data may include object identification information for various objects disposed in the space (e.g., road) on which the self-driving vehicle 1700*b* runs. For example, the map data may include object identification information for fixed objects, such as a streetlight, a rock, and a building, etc., and mobile objects, such as a vehicle and a pedestrian. Furthermore, the object identification information may include a name, a type, a distance, a location, etc.

Furthermore, the self-driving vehicle 1700*b* may perform an operation or run by controlling the driver based on a user's control/interaction. In this case, the self-driving vehicle 1700*b* may obtain intention information of an interaction according to a user' behavior or voice speaking, may determine a response based on the obtained intention information, and may perform an operation.

AI+XR

The AI technology is applied to the XR device 1700*c*, and the XR device 1700*c* may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 1700*c* may generate location data and attributes data for three-dimensional (3D) points by analyzing 3D point cloud data or image data obtained through various sensors or from an external device, may obtain information on a surrounding space or real object based on the generated location data and attributes data, and may output an XR object by rendering the XR object. For example, the XR device 1700*c* may output an XR object including additional information for a recognized object by making the XR object correspond to the corresponding recognized object.

The XR device 1700*c* may perform the above operations using a learning model consisting of at least one artificial neural network. For example, the XR device 1700*c* may recognize a real object in 3D point cloud data or image data using a learning model, and may provide information corresponding to the recognized real object. In this case, the learning model may have been directly trained in the XR device 1700*c* or may have been trained in an external device such as the AI server 1600.

In this instance, the XR device 1700*c* may directly generate results using a learning model and perform an operation, but may perform an operation by transmitting sensor information to an external device such as the AI server 1600 and receiving results generated in response to this.

AI+Robot+Self-Driving

The AI technology and the self-driving technology are applied to the robot 1700*a*, and the robot 1700*a* may be implemented as a guidance robot, a transport robot, a cleaning robot, a wearable robot, an entertainment robot, a pet robot, an unmanned aerial robot, etc.

The robot 1700a to which the AI technology and the self-driving technology are applied may mean a robot itself having a self-driving function, or may mean the robot 1700a interacting with the self-driving vehicle 1700b.

The robot 1700a with the self-driving function may collectively refer to devices that move by itself along a given path without control of a user or determine by itself a moving path and move.

The robot 1700a with the self-driving function and the self-driving vehicle 1700b may use a common sensing method to determine one or more of a moving path or a running plan. For example, the robot 1700a with the self-driving function and the self-driving vehicle 1700b may determine one or more of a moving path or a running plan using information sensed through LIDAR, a radar, a camera, etc.

The robot 1700a interacting with the self-driving vehicle 1700b is present separately from the self-driving vehicle 1700b, and may perform an operation associated with a self-driving function inside or outside the self-driving vehicle 1700b or an operation associated with a user got in the self-driving vehicle 1700b.

In this case, the robot 1700a interacting with the self-driving vehicle 1700b may control or assist the self-driving function of the self-driving vehicle 1700b by obtaining sensor information in place of the self-driving vehicle 1700b and providing the sensor information to the self-driving vehicle 1700b, or by obtaining sensor information, generating surrounding environment information or object information, and providing the surrounding environment information or object information to the self-driving vehicle 1700b.

Alternatively, the robot 1700a interacting with the self-driving vehicle 1700b may control the function of the self-driving vehicle 1700b by monitoring a user got in the self-driving vehicle 1700b or through an interaction with a user. For example, if it is determined that a driver is in a drowsiness state, the robot 1700a may activate the self-driving function of the self-driving vehicle 1700b or assist control of a driving unit of the self-driving vehicle 1700b. Herein, the function of the self-driving vehicle 1700b controlled by the robot 1700a may include a function provided by a navigation system or audio system provided within the self-driving vehicle 1700b, in addition to a self-driving function simply.

Alternatively, the robot 1700a interacting with the self-driving vehicle 1700b may provide information to the self-driving vehicle 1700b or may assist a function outside the self-driving vehicle 1700b. For example, the robot 1700a may provide the self-driving vehicle 1700b with traffic information including signal information, etc., as in a smart traffic light, and may automatically connect an electric charger to a filling inlet through an interaction with the self-driving vehicle 1700b as in the automatic electric charger of an electric vehicle.

AI+Robot+XR

The AI technology and the XR technology are applied to the robot 1700a, and the robot 1700a may be implemented as a guidance robot, a transport robot, a cleaning robot, a wearable robot, an entertainment robot, a pet robot, an unmanned aerial robot, a drone, etc.

The robot 1700a to which the XR technology is applied may mean a robot that is a target of control/interaction within an XR image. In this case, the robot 1700a is different from the XR device 1700c, and they may operate in conjunction with each other.

If the robot 1700a that is a target of control/interaction within the XR image obtains sensor information from sensors including a camera, the robot 1700a or the XR device 1700c may generate an XR image based on the sensor information, and the XR device 1700c may output the generated XR image. Furthermore, the robot 1700a may operate based on a control signal received through the XR device 1700c or a user's interaction.

For example, a user may identify a corresponding XR image at time of the robot 1700a remotely operating in conjunction through an external device such as the XR device 1700c, may adjust a self-driving path of the robot 1700a through an interaction, may control an operation or driving, or may identify information of a surrounding object.

AI+Self-Driving+XR

The AI technology and the XR technology are applied to the self-driving vehicle 1700b, and the self-driving vehicle 1700b may be implemented as a mobile robot, a vehicle, an unmanned aerial vehicle, etc.

The self-driving vehicle 1700b to which the XR technology is applied may mean a self-driving vehicle provided with a means for providing an XR image or a self-driving vehicle that is a target of control/interaction within the XR image. Particularly, the self-driving vehicle 1700b that is the target of control/interaction within the XR image is different from the XR device 1700c, and they may operate in conjunction with each other.

The self-driving vehicle 1700b provided with the means for providing the XR image may obtain sensor information from sensors including a camera, and may output the XR image generated based on the obtained sensor information. For example, the self-driving vehicle 1700b includes an HUD, and may provide a passenger with an XR object corresponding to a real object or an object within a screen by outputting an XR image.

In this case, when the XR object is output to the HUD, at least a part of the XR object may be output to overlap with a real object toward which a passenger's view is directed. On the other hand, when the XR object is output to a display included within the self-driving vehicle 1700b, at least a part of the XR object may be output to overlap with an object within a screen. For example, the self-driving vehicle 1700b may output XR objects corresponding to objects, such as a carriageway, other vehicles, a traffic light, a signpost, a two-wheeled vehicle, a pedestrian, and a building.

If the self-driving vehicle 1700b that is a target of control/interaction within an XR image obtains sensor information from sensors including a camera, the self-driving vehicle 1700b or the XR device 1700c may create an XR image based on the sensor information, and the XR device 1700c may output the created XR image. Furthermore, the self-driving vehicle 1700b may operate based on a control signal received through an external device, such as the XR device 1700c, or a user's interaction.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed.

Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the method of transmitting and receiving signals in the wireless communication system of the present disclosure has been mainly described as an example applied to the 3GPP LTE/LTE-A system and the 5G system (New RAT system), it is possible to apply it to various wireless communication systems in addition.

The invention claimed is:

1. A method for transmitting and receiving a signal by a receiving apparatus in a wireless communication system, the method comprising:
  receiving, from a transmitting apparatus, signals modulated based on a differential phase shift keying (DPSK) method through a plurality of reception paths;
  calculating a differential value in each reception path of the plurality of reception paths based on the received signals; and
  calculating reliability for the received signals,
  wherein the reliability is proportional to a real value of a sum of the differential values in each reception path of the plurality of reception paths.

2. The method of claim 1, wherein the reliability is proportional to a number of the plurality of reception paths of the receiving apparatus.

3. The method of claim 1, wherein it is interpreted that the more a case where the differential value in each reception path of the plurality of reception paths corresponds to either one of 1 or −1, the higher the reliability.

4. The method of claim 1, further comprising:
  calculating a channel quality, wherein the channel quality is calculated as a real value of values obtained by receiving two consecutive reference signals through all the reception paths of the receiving apparatus and summing differential values in each reception path of all the reception paths based on the two consecutive reference signals.

5. The method of claim 4, wherein the channel quality is related to a number of all the reception paths of the receiving apparatus.

6. The method of claim 5, wherein a maximum value of the channel quality corresponds to a positive value of the number of all the reception paths, a minimum value thereof corresponds to a negative value of the number of all the reception paths, and a range of the channel quality is in a range of the minimum value to the maximum value.

7. The method of claim 4, further comprising:
  receiving a maximum value in a range of the channel quality from the transmitting apparatus.

8. The method of claim 7, wherein when the calculated value of the channel quality is greater than the maximum value of the range of the channel quality, the maximum value of the range of the channel quality is reported, and when the calculated value is less than a negative value of the maximum value of the range of the channel quality, the negative value of the maximum value of the range of the channel quality is reported.

9. The method of claim 7, further comprising:
  receiving information on the number of times to transmit a reference signal for measuring the channel quality from the transmitting apparatus when the maximum value of the range of the channel quality is greater than the number of all the reception paths, wherein the channel quality is calculated by measuring and summing channel quality corresponding to a multiple of the number of times the reference signal is transmitted.

10. The method of claim 9, wherein the information is received through a physical layer signal or higher layer signaling.

11. The method of claim 4, further comprising:
  receiving information on a number of times to repeat the calculating of the channel quality, wherein the channel quality is reported as an average value of channel quality values measured by repeating the calculating of the channel quality based on the information on the number of repetitions.

12. The method of claim 11, wherein an operation of repeating the calculating of the channel quality is triggered by one of the transmitting apparatus or the receiving apparatus.

13. The method of claim 4, further comprising:
  transmitting the number of all the reception paths of the receiving apparatus to the transmitting apparatus upon initial connection.

14. An apparatus for transmitting and receiving a signal in a wireless communication system, the apparatus comprising:
  transmitter and receiver configured to transmit and receive, respectively, a radio signal; and
  a processor operatively connected to the transmitter and receiver,
  wherein the processor receives signals modulated based on a differential phase shift keying (DPSK) method through a plurality of reception paths, calculates a differential value in each reception path of the plurality of reception paths based on the received signals, and calculates reliability for the received signals, and the reliability is proportional to a real value of a sum of the differential values in each reception path of the plurality of reception paths.

15. The apparatus of claim 14, wherein the plurality of reception paths include a plurality of antennas, and the reliability is proportional to a number of the plurality of antennas.

16. The apparatus of claim 14, wherein each reception path of the plurality of reception paths includes a 1-bit analog to digital converter (ADC).

* * * * *